Feb. 3, 1953    P. WEYNAND    2,627,262
CUTTER HOLDER FOR STONE DRESSERS AND THE LIKE
Original Filed April 22, 1947
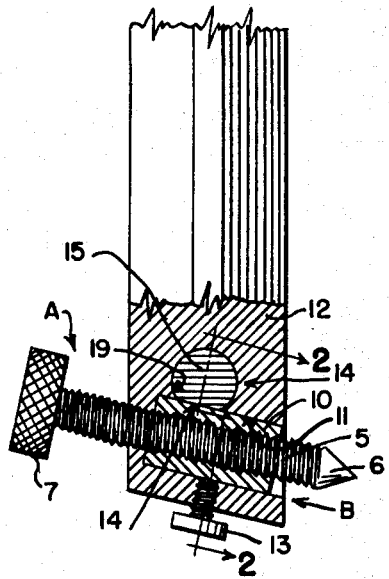
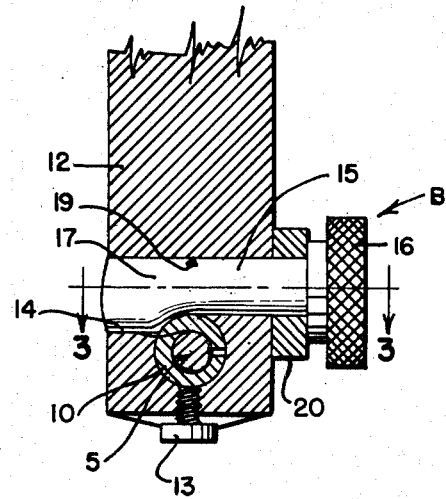
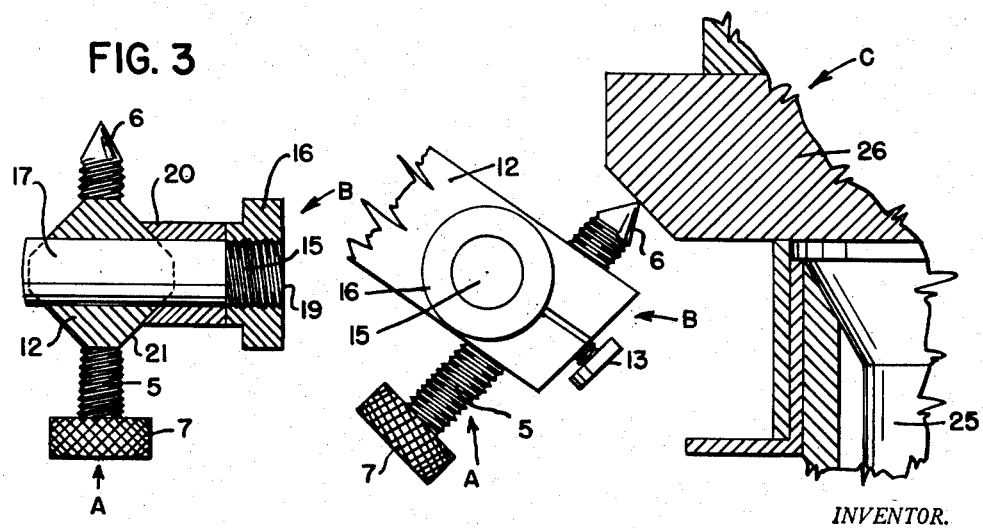
INVENTOR.
Paul Weynand
BY
Lancaster, Allwine & Rommel
Attorneys Patented Feb. 3, 1953

2,627,262

UNITED STATES PATENT OFFICE 2,627,262

CUTTER HOLDER FOR STONE DRESSERS AND THE LIKE

Paul Weynand, San Antonio, Tex.

Original application April 22, 1947, Serial No. 743,079, now Patent No. 2,471,991, dated May 31, 1949. Divided and this application June 9, 1948, Serial No. 31,904

2 Claims. (Cl. 125—39)

This invention relates to cutter holders for stone dressing machines and the like, and is a division of my application for United States Patent, Serial No. 743,079, filed April 22, 1947, for Improvements in Stone Dressers, and which has matured into Patent 2,471,991, dated May 31, 1949.

An important object of the invention is to provide cutter holders for the conventional cutters, having cylindrical shank portions, which holders are so constructed and arranged that they will prevent accidental rotation of the cutters during use of the latter.

Another important object is to provide, in a cutter holder, manually rotatable cutter-holding means which means will not be apt to become jarred into rotation due to vibrations of the dressing machine with which it is associated.

A further important object is to provide a cutter holder which will retain the cutter in a fixed or set position irrespective of the distance the cutter point projects outwardly of the dressing bar.

Other objects and advantages of the invention will be apparent during the course of the following detailed description of the invention, taken in connection with the accompanying drawings, forming a part of this disclosure, and in which drawings:

Fig. 1 is a view, mostly in vertical section of the novel cutter holder, with a cutter in elevation.

Fig. 2 is a vertical section, substantially on the line 2—2 of Fig. 1.

Fig. 3 is a horizontal section, substantially on the line 3—3 of Fig. 2.

Fig. 4 is an elevation of the novel cutter holder, carrying a cutter in position to engage a stone, a fragment of which is shown in section.

In the drawing, wherein for the purpose of illustration is shown a preferred embodiment of the invention, and wherein similar reference characters designate corresponding parts thruout the several views, the letter A designates a cutter device; B, the new cutter device holder; and C a pilot assembly.

The cutter device A is of conventional construction and comprises a screw-threaded shank 5 having a suitable cutter element 6 (as a diamond point) at one end and a head 7 at its other end.

The cutter device holder B includes an interiorly screw-threaded, split sleeve 10 surrounding the intermediate portion of the shank 5 and extending into a suitable opening 11 extending transversely through an elongated dressing bar 12. This opening 11 preferably extends with its axis forming obtuse angles with the adjacent faces of the dressing bar 12, and its axis is inclined from the longitudinal axis of the dressing bar, as shown in Fig. 1. Consequently the longitudinal axis of the shank 5 is also inclined with respect to the longitudinal axis of the dressing bar 12. A set screw 13 may be employed to assist in securing the split sleeve 10 in place and tends to compress it, since, as in Fig. 2, it bears against the outer periphery of the split sleeve at a location substantially 180° from the contact of the cam surface with the split sleeve, so that as the set screw presses the split sleeve toward the cam surface, the cam surface forces the split sleeve toward the free end of the set screw. Associated with the split sleeve 10 is a major locking device 14, comprising a shank 15, screw-threaded at one end and to which a knurled nut 16 is secured by means of the screw threads. The free end portion 17 of the shank 15 is enlarged over the intermediate portion of the shank with the enlarged end providing a cam surface 18 at the juncture of this end portion 17 and the intermediate portion of the shank. The shank 15 is constructed and arranged to be inserted into a suitable bore or second opening 19 in the dressing bar, spaced above the opening 11 and with its axis normal to the axis of the opening 11. This insertion may be made, since the nut 16 is removable. This nut bears against a block 20 which has a bore for the shank 15 and a substantially V-shaped slot 21 in the face opposite its nut-contacting face, with the slot accommodating an edge portion of the dressing bar as may be seen in Fig. 3. As the shank is drawn to the right in Fig. 3, upon tightening of the nut the cam surface 18 bears against the sleeve 10, as is clear in Fig. 2, and causes tightening of the sleeve 10 and prevents longitudinal movement thereof. Obviously manual rotation of the head 7 will feed the cutter element 6 (diamond point) toward or away from the dressing bar 12.

The pilot assembly C is fully illustrated and described in my United States Patents No. 2,387,787 dated October 30, 1945 and No. 2,443,489, dated June 15, 1948. It includes a pilot shaft 25 carrying a stone 26.

In inserting a cutter device A in a holder B, the operator may unscrew the set screw 13 slightly so that the split sleeve 10 is not under compression, and also manipulate the major locking device 14 so that its cam surface 18 of the enlarged free end portion 17 will not interfere with the insertion of the cutter device A into the split sleeve 10 (that is, the cam surface will not engage the split sleeve). After the cutter device A is inserted, the set screw 13 is tightened and this both prevents rotation of the split sleeve 10 and also tends to tighten the latter about the shank 5 of the cutter device. Now, by feeding the major locking device 14 so that the cam surface of the enlarged end portion 17 will move against the outer periphery of the split sleeve 10, there will be a pressure exerted thereon just opposite the engagement of the shank of the set screw 13 with the split sleeve. The cutter device is now securely held against being accidentally jarred into rotation. However, upon relieving the pressure of the cam surface and slightly unscrewing the set screw 13, the cutter device may be manually rotated.

Various changes may be made to the form of the invention herein shown and described without departing from the spirit of the invention or scope of the claims.

What is claimed is:

1. In a stone dresser, a cutter device holding and locking means for a cutter device having a screw-threaded shank portion provided with a cutter, said means including an elongated dressing bar portion provided with a transversely-extending opening receiving a part of said shank portion and being of a circumference substantially greater than the circumference of said shank portion; an interiorly screw-threaded split sleeve with its screw threads in screw threaded engagement with a part of the screw threads of said shank portion and extending about the part of said shank portion within said opening, said dressing bar portion also having a second opening with its longitudinal axis substantially normal to the longitudinal axis of the first-mentioned opening and with the peripheries of the openings merging into each other at substantially the axial center of said dressing bar; a longitudinally slidable shank within said second opening with the central portion of the periphery of said shank having a cam surface extending into the first mentioned opening and constructed and arranged to compress said split sleeve when bearing against a part of the outer periphery of said split sleeve; means to selectively move said shank to cause said cam surface to move into and out of camming engagement with said split sleeve; and a set screw carried by said dressing bar with the free end of the shank of said set screw normally pressed against the outer periphery of said split sleeve at a location substantially 180° from the contact of said cam surface and outer periphery of said split sleeve, whereby as said set screw presses said sleeve toward said cam surface, said cam surface forces said sleeve toward the free end of said set screw.

2. In a stone dresser, a cutter device holding and locking means for a cutter device having a screw-threaded shank portion provided with a cutter, said means including an elongated dressing bar portion provided with a transversely extending smooth-bored opening receiving a part of said shank portion and being of a circumference substantially greater than the circumference of said shank portion; an interiorly screw-threaded split sleeve with its screw threads in screw threaded engagement with a part of the screw threads of said shank portion and extending about the part of said shank portion within said opening, said split sleeve having a smooth outer periphery slidable over the smooth surface of said opening, said dressing bar portion also having a second opening with its longitudinal axis substantially normal to the longitudinal axis of the first-mentioned opening and with the peripheries of the openings merging into each other at substantially the axial center of said dressing bar; a longitudinally slidable shank within said second opening with the central portion of the periphery of said shank having a cam surface extending into the first mentioned opening and constructed and arranged to compress said split sleeve when bearing against a part of the outer periphery of said split sleeve; means to selectively move said shank to cause said cam surface to move into and out of camming engagement with said split sleeve; and a set screw carried by said dressing bar with the free end of the shank of said set screw normally pressed against the outer periphery of said split sleeve at a location substantially 180° from the contact of said cam surface and outer periphery of said split sleeve, whereby as said set screw presses said sleeve toward said cam surface, said cam surface forces said sleeve toward the free end of said set screw.

PAUL WEYNAND.

REFERENCES CITED

The following references are of record in the file of this patent:

UNITED STATES PATENTS

| Number | Name | Date |
|---|---|---|
| 661,684 | Ball | Nov. 13, 1900 |
| 952,470 | Shapowalow | Mar. 22, 1910 |
| 1,300,204 | Waczula | Apr. 8, 1919 |
| 1,379,539 | Dolan | May 24, 1921 |
| 1,505,322 | Desmon | Aug. 19, 1924 |
| 1,599,612 | Dover | Sept. 14, 1926 |
| 1,763,479 | Richardson | June 10, 1930 |
| 1,826,219 | Parker | Oct. 6, 1931 |

FOREIGN PATENTS

| Number | Country | Date |
|---|---|---|
| 556,675 | Great Britain | Oct. 15, 1943 |